(12) United States Patent
Long et al.

(10) Patent No.: US 9,383,004 B2
(45) Date of Patent: Jul. 5, 2016

(54) SYSTEM AND METHOD FOR FEED FORWARD CONTROL OF A HYDRAULIC CONTROL SYSTEM OF A TRANSMISSION

(71) Applicant: Allison Transmission, Inc., Indianapolis, IN (US)

(72) Inventors: Charles F. Long, Zionsville, IN (US); Charles T. Taylor, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 317 days.

(21) Appl. No.: 14/195,905

(22) Filed: Mar. 4, 2014

(65) Prior Publication Data

US 2014/0260229 A1 Sep. 18, 2014

Related U.S. Application Data

(63) Continuation of application No. 13/826,527, filed on Mar. 14, 2013.

(51) Int. Cl.
| | |
|---|---|
| *F16H 61/42* | (2010.01) |
| *F16H 61/02* | (2006.01) |
| *F16H 57/04* | (2010.01) |
| *F01M 1/00* | (2006.01) |
| *F16H 61/00* | (2006.01) |

(52) U.S. Cl.
CPC .............. *F16H 61/0265* (2013.01); *F01M 1/00* (2013.01); *F16H 57/04* (2013.01); *F16H 57/0413* (2013.01); *F16H 57/0434* (2013.01); *F16H 57/0435* (2013.01); *F16H 57/0446* (2013.01); *F16H 61/0021* (2013.01); *F16H 61/0025* (2013.01); *F16H 61/42* (2013.01); *F16H 2061/0037* (2013.01)

(58) Field of Classification Search
CPC ......... F16H 57/04; F16H 61/38; F16H 61/40; F16H 61/42
USPC ................................................... 60/449, 452
See application file for complete search history.

(56) References Cited

U.S. PATENT DOCUMENTS

| 8,182,238 B2 | 5/2012 | Frait |
| 2007/0101709 A1 | 5/2007 | Cronin |

(Continued)

OTHER PUBLICATIONS

Notification of Transmittal of the International Search Report and the Written Opinion of the International Searching Authority, or the Declaration, Jun. 19, 2014, International Searching Authority.

*Primary Examiner* — Thomas E Lazo
(74) *Attorney, Agent, or Firm* — Taft Stettinius & Hollister LLP; Stephen F. Rost

(57) ABSTRACT

The present disclosure provides a hydraulic system of a transmission having a controller and a variable displacement pump. The pump includes an inlet and outlet and is adapted to be driven by a torque-generating mechanism. The system also includes a lube circuit fluidly coupled to the pump. A lube regulator valve is disposed in the lube circuit, such that the lube regulator valve is configured to move between at least a regulated position and an unregulated position. The regulated position corresponds to a regulated pressure in the lube circuit. A pressure switch is fluidly coupled to the lube regulator valve and configured to move between a first position and a second position, where the switch is disposed in electrical communication with the controller. A solenoid is disposed in electrical communication with the controller and is controllably coupled to the pump to alter the displacement of the pump.

36 Claims, 11 Drawing Sheets

(56) References Cited

U.S. PATENT DOCUMENTS

| | | | |
|---|---|---|---|
| 2010/0254828 A1* | 10/2010 | Frait | F16H 61/0021 417/53 |
| 2011/0144846 A1 | 6/2011 | Zollner et al. | |
| 2011/0196585 A1 | 8/2011 | Ishibashi et al. | |
| 2011/0197982 A1 | 8/2011 | Moorman et al. | |

* cited by examiner

| RESTRICTIONS – "R" | | | INDIVIDUAL RESTRICTIONS, EQUIV. DIA. | | | |
|---|---|---|---|---|---|
| Converter Mode | Lockup Mode | | Converter Mode | Lockup Mode | Cooler | Lube |

700 → 702, 704

| BLEEDS – "B" | | | | | | | |
|---|---|---|---|---|---|---|---|
| Reverse | Neutral | First Range | Second Range | Third Range | Fourth Range | Fifth Range | Sixth Range |

706

| LEAKAGE FACTOR FOR CONTROLS – "C" | | | | | | | |
|---|---|---|---|---|---|---|---|
| Reverse | Neutral | First Range | Second Range | Third Range | Fourth Range | Fifth Range | Sixth Range |

708

| PUMP LEAKAGE FACTOR – "P" | |
|---|---|
| Pump Displacement | Leakage Factor |

710

| ADDITIONAL INFORMATION | | |
|---|---|---|
| Individual Clutch Bleed Diameters | Individual Clutch Fill Flow "F" Data | Fluid Viscosity Factors |

//  # SYSTEM AND METHOD FOR FEED FORWARD CONTROL OF A HYDRAULIC CONTROL SYSTEM OF A TRANSMISSION

RELATED APPLICATIONS

This application is a continuation of U.S. patent application Ser. No. 13/826,527, filed Mar. 14, 2013, entitled "SYSTEM AND METHOD FOR CONTROLLING PUMP PERFORMANCE IN A TRANSMISSION", the disclosure of which is hereby incorporated by reference in its entirety.

FIELD OF THE DISCLOSURE

The present disclosure relates to a transmission control system, and in particular, to a system and method for controlling pump performance in a transmission.

BACKGROUND

In a conventional powered machine, a prime mover can operate at different speeds and produce different levels of power that is transferred to a transmission. In one instance, the prime mover can be an engine. In turn, the transmission can transfer torque to a driveline or final drive assembly, which can be directly mounted to the wheels or tracks of the powered machine. The transmission can include an internal pump that is rotatably driven by the prime mover, and based on the different speeds of the prime mover, the pump can produce different levels of fluid flow and pressure. In some instances, there is only one internal pump in the transmission that provides fluid flow to a main pressure circuit and lube circuit of the transmission.

A conventional hydraulic pump is often designed as a result of its desired functionality. In an engine-transmission application, for example, a conventional hydraulic pump may be designed for one of several reasons, namely, 1) to provide adequate fluid flow at a low engine idle speed (e.g., approximately 500 RPM), 2) to provide full regulated pressure to the main pressure circuit of the transmission at a specific engine speed (e.g., approximately 1000 RPM), and/or 3) to fill a transmission clutch within a desired time period (e.g., approximately 200 ms at 1200 RPM). Other design considerations may include margin of safety and leakage at a fluid temperature of about 120° C. In view of the different design considerations accounted for in a hydraulic pump, however, the pump still often tends to overproduce fluid flow at or above normal operating conditions and engine speeds.

Moreover, once the hydraulic pump is able to provide adequate fluid flow to the control and lube systems of the transmission, additional fluid flow produced by the pump is generally returned to transmission sump and is unusable. This excess fluid flow, however, directly contributes to hydraulic spin-loss inside the transmission. In effect, this reduces transmission productivity and performance.

One possible solution to the excess flow produced by the hydraulic pump is to incorporate a variable displacement pump into the transmission design. A variable displacement pump can increase or decrease volume inside the fluid cavity of the pump, thereby controlling the pump displacement and production of fluid flow. By controlling displacement, the pump can produce a more desirable amount of flow under steady-state conditions. When the transmission is in a certain range, for example, the hydraulic demand is usually fairly low and the volume of the oil cavity can be decreased, thereby resulting is reduced overall pump flow. Likewise, during a shift between ranges, the hydraulic demand increases for filling a clutch such that the volume of the oil cavity is increased and more flow is produced to meet demand.

Since the "decrease" pressure is based off of pressure in the main circuit, however, there is an inherit response time drawback. In other words, the demand to increase fluid flow (e.g., when filling a clutch) begins before the volume of the pump cavity increases ("decrease" pressure responds). Thus, regardless of what improvements are made to the pump and transmission system, the hydraulic demand rises before the pump can supply the desired flow, thereby resulting in an undesirable time delay to fill the clutch. This can impact fuel economy and shift quality.

A need therefore exists for electronically controlling the pump capacity of the transmission. By controlling pump capacity, it is also desirable to control fluid flow from the pump to minimize excess flow once the different fluid circuits of the transmission are satisfied, improve shift quality, and control fluid temperature of the transmission.

SUMMARY

In an exemplary embodiment of the present disclosure, a hydraulic system of a transmission includes a controller and a variable displacement pump. The pump is adapted to be driven by a torque-generating mechanism and includes an inlet and an outlet. Moreover, the pump is configured to generate fluid flow and pressure throughout the system. The system also includes a main circuit fluidly coupled to the pump and a main regulator valve disposed in the main circuit. The main regulator valve is configured to move between at least a regulated position and an unregulated position, where the regulated position corresponds to a regulated pressure in the main circuit. A pressure switch is fluidly coupled to the main regulator valve and configured to move between a first position and a second position, where the switch is disposed in electrical communication with the controller. A solenoid is disposed in electrical communication with the controller, such that the solenoid is controllably coupled to the pump to alter the displacement of the pump.

In one aspect of this embodiment, once the fluid pressure in the main circuit reaches a substantially regulated condition, the main regulator valve moves from the unregulated position to the regulated position. In another aspect, the pressure switch is configured to detect the movement of the main regulator valve between the regulated position and unregulated position and the pressure switch moves between the first position and the second position upon movement of the main regulator valve. In a further aspect, the movement of the pressure switch between the first position and second position induces a signal triggered to the controller such that the controller controllably actuates the solenoid based on the signal. In yet a further aspect, the pump displacement is controllable between a first displacement and a second displacement, where the fluid flow distributed from the outlet is adjustably controlled based on the pump displacement and the actuation of the solenoid controllably adjusts pump displacement.

In a different aspect of this embodiment, a lube circuit is fluidly coupled to the pump and main circuit and a lube regulator valve is disposed in the lube circuit. The lube regulator valve is configured to move between at least a regulated position and an unregulated position, where the regulated position corresponds to a regulated pressure in the lube circuit. A second pressure switch is fluidly coupled to the lube regulator valve and configured to move between a first position and a second position, where the second pressure switch is disposed in electrical communication with the controller.

Related thereto, the lube regulator valve moves to its regulated position after the main regulator valve moves to its regulated position. Moreover, the lube regulator valve moves from the unregulated position to the regulated position once the fluid pressure in the lube circuit reaches a substantially regulated condition and the second pressure switch is configured to detect the movement of the lube regulator valve between the regulated position and unregulated position, where the pressure switch moves between the first position and the second position upon movement of the main regulator valve. Further related thereto, the movement of the second pressure switch between the first position and second position induces a signal triggered to the controller and the controller controllably actuates the solenoid based on the signal to adjust displacement of the pump.

In another embodiment, a hydraulic system of a transmission includes a controller and a variable displacement pump. The pump is adapted to be driven by a torque-generating mechanism and includes an inlet and an outlet. Moreover, the pump is configured to generate fluid flow and pressure throughout the system. The system also includes a lube circuit fluidly coupled to the pump and a lube regulator valve disposed in the lube circuit. The lube regulator valve is configured to move between at least a regulated position and an unregulated position, where the regulated position corresponds to a regulated pressure in the lube circuit. A pressure switch is fluidly coupled to the lube regulator valve and configured to move between a first position and a second position, where the switch is disposed in electrical communication with the controller. A solenoid is disposed in electrical communication with the controller, such that the solenoid is controllably coupled to the pump to alter the displacement of the pump.

In one aspect of this embodiment, once the fluid pressure in the lube circuit reaches a substantially regulated condition, the lube regulator valve moves from the unregulated position to the regulated position. In another aspect, the pressure switch is configured to detect the movement of the lube regulator valve between the regulated position and unregulated position and the pressure switch moves between the first position and the second position upon movement of the lube regulator valve. Related thereto, the movement of the pressure switch between the first position and second position induces a signal triggered to the controller and the controller controllably actuates the solenoid based on the signal. In a further aspect, the pump displacement is controllable between a first displacement and a second displacement, where the fluid flow distributed from the outlet is adjustably controlled based on the pump displacement and the actuation of the solenoid controllably adjusts pump displacement.

In an alternative aspect, the system can include a main circuit fluidly coupled to the pump and lube circuit and a main regulator valve disposed in the main circuit. The main regulator valve is configured to move between at least a regulated position and an unregulated position, where the regulated position corresponds to a regulated pressure in the main circuit. In addition, a second pressure switch is fluidly coupled to the main regulator valve and configured to move between a first position and a second position, where the second pressure switch is disposed in electrical communication with the controller. In a similar aspect, the solenoid is controllably actuates between a first condition and a second condition upon movement of at least one of the main regulator valve and the lube regulator valve to its regulated position.

In yet a further aspect, the system can include a temperature sensor disposed in electrical communication with the controller. The temperature sensor is adapted to detect a temperature of the fluid in the transmission. The system can also include a cooler circuit fluidly coupled to the pump and main circuit, where the cooler circuit is structured to receive fluid and adjust its temperature as the fluid passes therethrough. Here, the temperature sensor is structured to detect the fluid temperature in the transmission and communicate said temperature to the controller. In turn, the controller controllably actuates the solenoid from a first electrical state to a second electrical, where the actuation between the first electrical state and the second electrical state adjusts the rate of fluid flow passing through the cooler circuit.

In a further exemplary embodiment, a method is provided for controlling fluid flow through a transmission. The transmission includes a controller, a variable displacement pump having an inlet and an outlet, a main circuit fluidly coupled to the pump, a lube circuit fluidly coupled to the pump and main circuit, a main regulator valve, a lube regulator valve, a pressure switch, and a solenoid. Here, the method includes pumping fluid from the pump into the main circuit until the fluid pressure in the main circuit reaches a first regulation point and fluidly actuating the main regulator valve from an unregulated position to a regulated position when the fluid pressure in the main circuit reaches the first regulation point. The method also includes pumping fluid into the lube circuit until the fluid pressure in the lube circuit reaches a second regulation point and fluidly actuating the lube regulator valve from an unregulated position to a regulated position when the fluid pressure in the lube circuit reaches the second regulation point. Moreover, the method includes moving the pressure switch from a first position to a second position and detecting the movement of the pressure switch from the first position to the second position. The solenoid is actuated from a first electrical state to a second electrical state and the displacement of the pump is adjusted from a first displacement to a second displacement.

In one aspect of this embodiment, the method can include controlling a rate of fluid flow pumped from the outlet. The method can also include increasing the displacement of the pump to increase the rate of fluid flow pumped from the outlet. Alternatively, the method can include decreasing the displacement of the pump to decrease the rate of fluid flow pumped from the outlet. In another aspect, the method includes detecting a fluid temperature with a temperature sensor, sending a signal to the controller based on the detected temperature, and adjusting the rate of fluid flow from the pump outlet until the detected temperature reaches a desired temperature. In a further aspect, the method can include triggering the pressure switch from the first position to the second position when the fluid pressure in the main circuit reaches the first regulation point or when the fluid pressure in the lube circuit reaches the second regulation point.

In an alternative aspect, the method includes moving a second pressure switch from a first position to a second position and detecting the movement of the second pressure switch from the first position to the second position. Related thereto, the method can include triggering the second pressure switch from the first position to the second position when either the fluid pressure in the main circuit reaches the first regulation point or the fluid pressure in the lube circuit reaches the second regulation point. Moreover, the solenoid is actuated from the first electrical state to the second electrical state when either the first pressure switch is moved from its first position to its second position or the second pressure switch is moved from its first position to its second position.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 7 is a table of exemplary inputs to the feed forward model of FIG. 6;

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
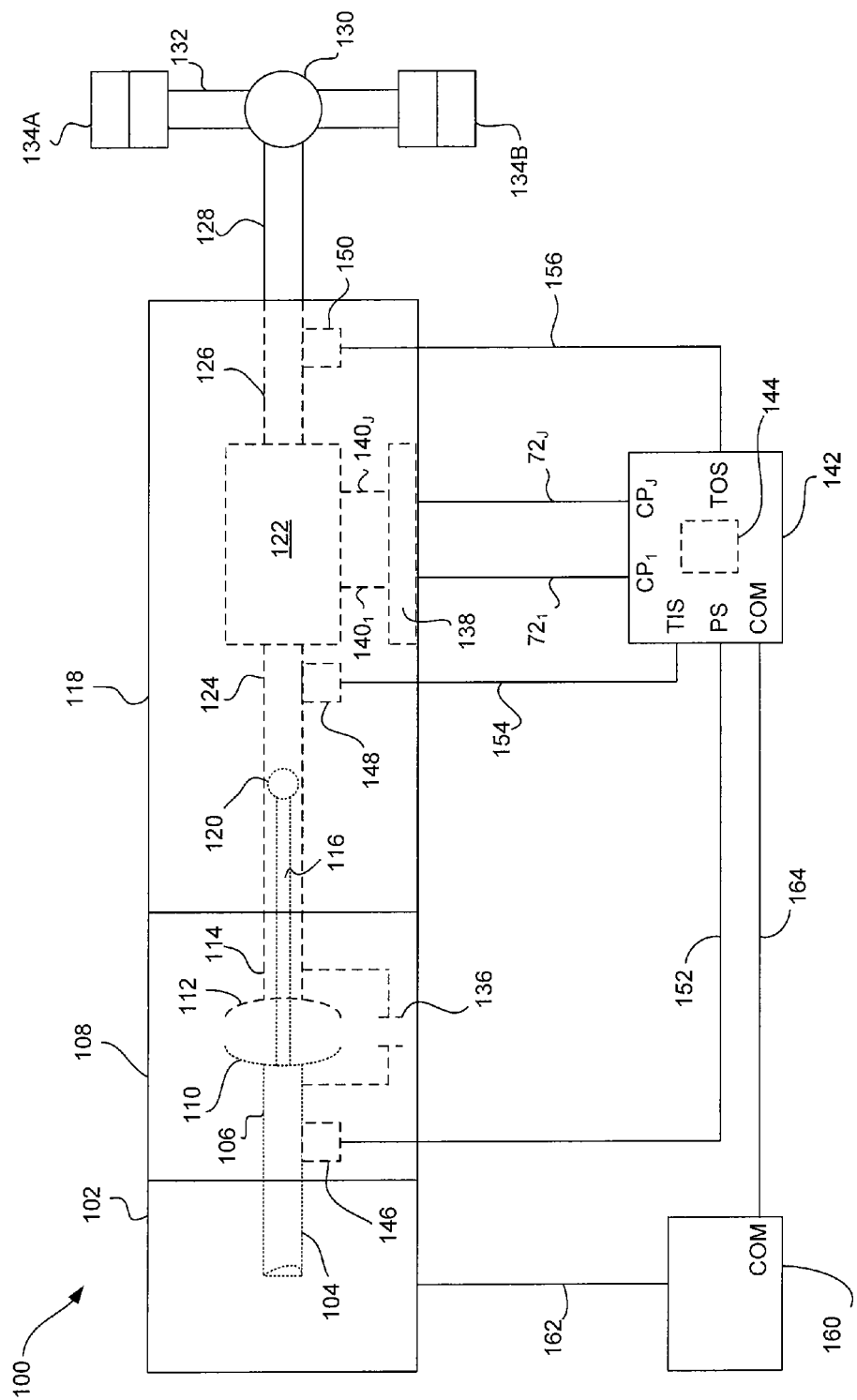
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 or transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150. The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols.

In the present disclosure, a system and method is disclosed for improving fluid flow through a hydraulic system of a transmission. The system and method can be for a hydraulic control system that utilizes hydraulic and electrical control features to improve stability, efficiency, and performance of the hydraulic system. Through these improvements, other factors such as transmission performance and fuel economy can be improved. Moreover, the present disclosure describes a model-based approach for achieving improvements in the control and performance of the hydraulic system and the transmission. Some aspects of the present disclosure can be incorporated into downloadable and readable software or instructions stored in the memory unit 144 of the control circuit 142.

In this disclosure, the transmission control circuit 142 may be interchangeably referred to as a transmission controller, or controller. In the event an engine control circuit is described, the engine control circuit may be referred to as an engine controller. In addition, fluid flow through the hydraulic system of the transmission can be described with respect to pressure and flow rate. Other characteristics of the fluid flow, such as temperature, may also be described. When the terms "fluid flow" is disclosed herein, it is intended to refer to the flow rate or volume of fluid flow passing through a point in the hydraulic system, whereas "fluid pressure" refers to the actual pressure of the fluid at a designated location in the system.

In a conventional hydraulic system of a transmission, a pump is rotationally driven by a torque-generating mechanism such as a torque converter. In some aspects, a prime mover or engine output may rotationally drive the pump. The pump can be a gerotor pump, a crescent-style pump, a variable displacement pump, or any other known pump. As the pump is rotationally driven, fluid can be collected through an inlet or suction port of the pump. As the pump rotates, fluid pressure and flow builds and the fluid is pumped through an outlet of the pump and into a main hydraulic circuit, or main circuit, of the hydraulic system. The fluid passing through the main circuit has a defined pressure, referred to as main pressure. The fluid can be pumped through the main circuit, and this pressure can be controlled by a valve. In this disclosure, the valve is referred to as a main regulator valve.

As the fluid is pumped into the main circuit, the main pressure can reach a steady-state condition. In one aspect, a solenoid can modulate or control the main pressure in the system. When there is a demand for fluid, e.g., to fill an oncoming clutch, the main pressure in the main circuit may decrease suddenly due to the immediate demand for fluid. The main regulator valve can react more quickly to this immediate demand than the pump. In any event, the lack of fluid pressure in the main circuit is detected and the pump is controlled to pump additional flow into the main circuit. In many conventional arrangements, however, this sudden increase in fluid flow causes an undershoot or depressed main pressure in the system. The delay between the demand and supply of fluid and then the sudden depleted supply of fluid due to the delayed response by the pump can negatively shift quality.

Figure 2:
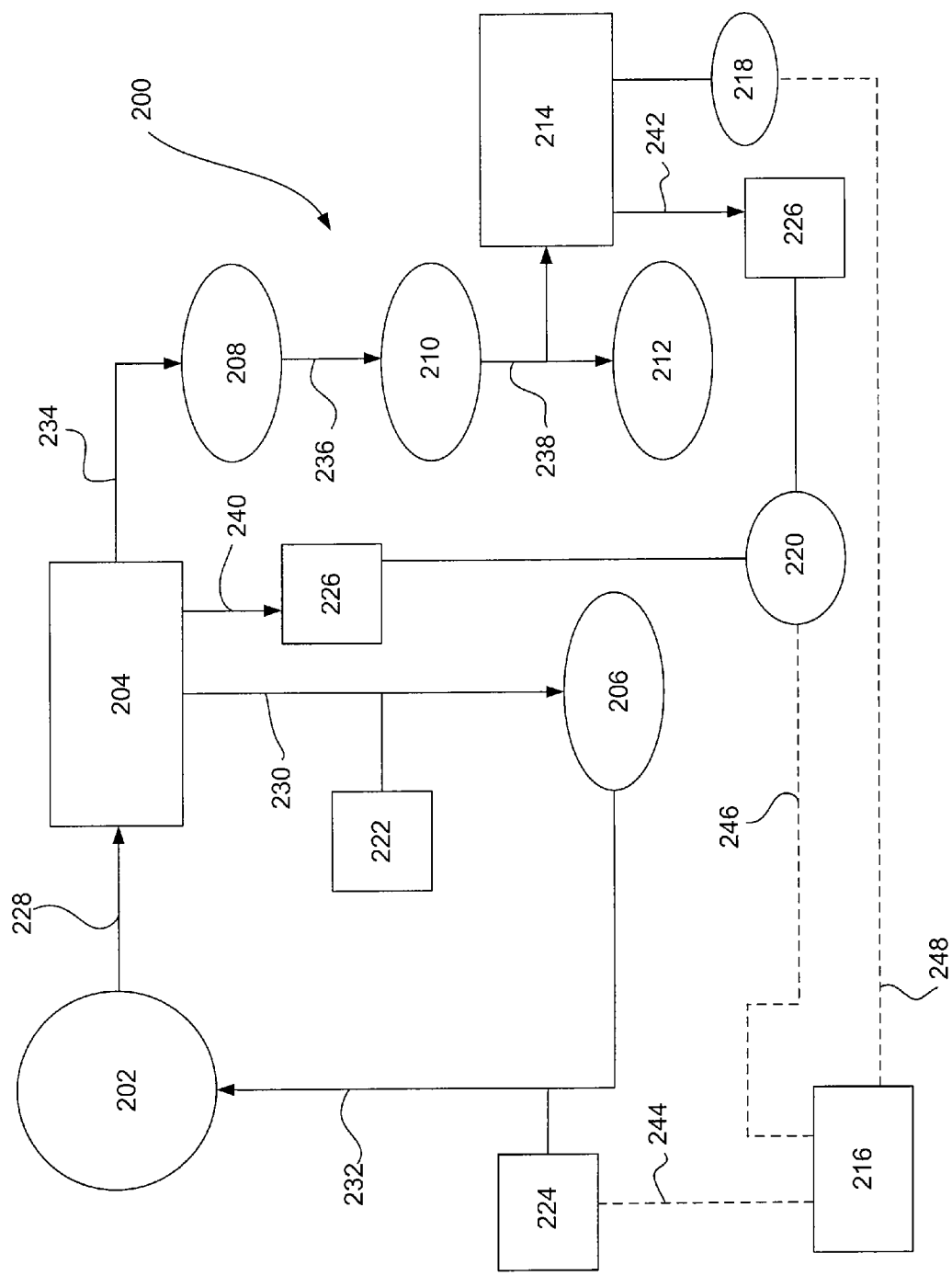
FIG. 2 is an exemplary schematic of a hydraulic control system of a transmission.

To address this issue, an exemplary hydraulic system 200 is illustrated in FIG. 2. The hydraulic system 200 includes a variable displacement pump 202. The variable displacement pump 202 is a pressure-based pump, such that if pressure is regulated in the system 200, the pump 202 can output the necessary fluid flow as needed. In other words, if pressure in the system 200 decreases, the pump 202 increases its flow until the pressure is regulated, and vice versa. To facilitate the regulation of pressure in the system 200, and particularly in the main circuit, a main regulator valve 204 is disposed in fluid communication with the pump 202. The main regulator valve 204 recognizes the pressure needed in the system 200, and particularly in the main circuit of the system 200. In this manner, the main regulator valve 204 acts as a feedback control such that the valve 204 strokes or moves between positions until pressure demands are met. In doing so, the main regulator valve 204 is controllably stroked against spring pressure exerted by a spring (not shown). The main regulator valve 204 can move to one defined position such that excess fluid is directed back to the suction port of the variable displacement pump 202. As a result, the main regulator valve 204 acts as a feedback control that converts fluid flow from the pump 202 into main pressure.

In FIG. 2, fluid is pumped from the outlet of the pump 202 along a main flow path 228 to the main regulator valve 204, and fluid is directed along hydraulic path 230 to satisfy the needs of a main circuit 206. The main circuit 206 includes the controls (e.g., clutches) for operating and controlling the transmission. Along the hydraulic path 230 is a solenoid 222 for modulating or regulating pressure in the main circuit 206. Therefore, the fluid pressure in the main circuit 206 can be regulated by the solenoid 222. Until now, however, the fluid flow in the system 200 has not been regulated or controlled.

As described, the control of the variable displacement pump 202 is via the main regulator valve 204. As the valve 204 strokes due to a pressure demand in the system, the pump pressure "decrease" or control changes due to the sudden demand for fluid in the system 200. The delayed response of the pump 202 can lead to an undershoot and overshoot of main pressure in the main circuit, which as previously described, can negatively impact the hydraulic system and transmission. To overcome this problem, it can be desirable to better control when the overshoot and undershoot conditions occur, and more specifically, alter or compensate for this by inducing the pressure response under steady-state conditions.

The variable displacement pump 202 produces fluid flow based off of input speed of the torque-generating mechanism and pressure. Thus, main pressure increases or decreases as the system pressure increases or decreases, and this is ideal under steady-state conditions. One feature of the present disclosure is compensating for the delayed time response of the pump 202 by increasing fluid flow as soon as possible, and preferably before there is a demand in the system due to a clutch fill, for example. Here, the supply of fluid can be initiated before the clutch fill process is initiated, thereby avoiding inconsistent clutch fill times. As such, garage shifts can be improved due to increased flow.

To understand how the fluid flow is controllable in the hydraulic system 200 of FIG. 2, a second flow path 234 and a third flow path 240 are fluidly coupled to the main regulator valve 204. As main pressure is regulated in the main circuit 206, the main regulator valve 204 can stroke to a new position to enable fluid to pass through the second flow path 234 and into a converter circuit 208. The converter circuit 208 can be part of the torque converter 108 as described above with reference to FIG. 1. Fluid can also pass through another flow path 236 and into a cooler circuit 210. The cooler circuit 210 can have an inlet and an outlet, and a means for regulating or controlling the temperature of fluid passing therethrough.

As the converter circuit 208 and cooler circuit 210 are satisfied with fluid flow, fluid continues to be pumped via another flow path 238 and into a lube circuit 212 of the hydraulic system 200. The lube circuit 212 enables fluid to lubricate bearings, clutches, shafts, gears, etc. in the transmission. Fluid pressure in the lube circuit 212 can be referred to as lube pressure. Similar to main pressure, the hydraulic system 200 can include a valve for regulating lube pressure. In this disclosure, the valve is referred to as a lube regulator valve 214. The lube regulator valve 214 is fluidly coupled to the lube circuit and is disposed in a location of the system 200 after the cooler circuit 210.

The lube regulator valve 214 can detect when the lube pressure has regulated in the lube circuit 212. Once lube pressure reaches its regulation point, the lube regulator valve 214 strokes or moves to a different position so that additional fluid is directed to a sump 226 of the transmission. In the embodiment of FIG. 2, the main regulator valve 204 can also be in fluid communication with sump 226 where excess fluid is directed along the third flow path 240 thereto. Similarly, the lube regulator valve 214 can direct fluid along a different flow path 242 so that excess fluid is dumped to sump 226.

Once the lube regulator valve 214 strokes to its regulated position, i.e., the position at which lube pressure has reached its regulation point, a pressure switch 218 can detect the movement of the valve 214 to this position. This movement can trigger the switch 218 to toggle or move to a different electrical state, thereby sending a signal to a controller 216 of the transmission. As shown in FIG. 2, the controller 216 and pressure switch 218 can be electrically coupled to one another along a communication path 248. In this manner, the pressure switch 218 acts like an input to a closed loop system in which the switch communicates with the controller 216. In turn, the controller 216 receives the signal from the switch 218 and understands the communication as being an indicator that the lube circuit 212 is satisfied. As a result, extra or excess flow is not useful to the hydraulic system 200.

Once the controller 216 receives the signal from the pressure switch 218, it can actuate a different solenoid 224 for controlling the pump flow. This solenoid can be referred to as a pump control solenoid 224 and is disposed along flow path 232. Flow path 232 can be fluidly coupled with the decrease port of the variable displacement pump 202. The pump flow can be controlled by altering or changing the displacement of the variable displacement pump 202. Here, the controller 216 can communicate with the pump control solenoid 224 via communication link 244. Thus, depending on the demands of the hydraulic system 200, the controller 216 can communicate with the pump control solenoid 224 to either increase or decrease pressure at the decrease port of the pump 202. This thereby increases or decreases the displacement of the pump 202.

Figure 3:
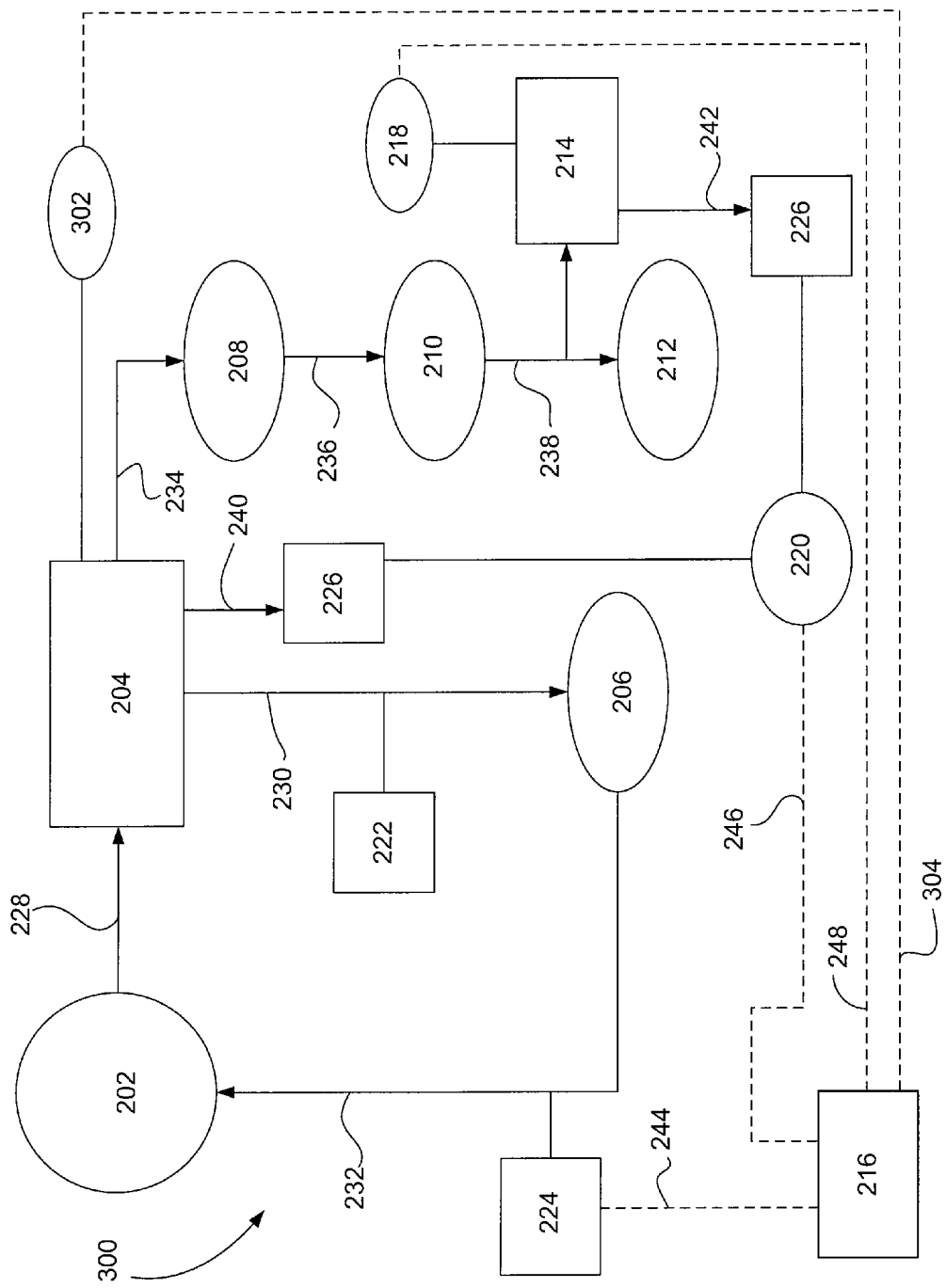
FIG. 3 is another exemplary schematic of a hydraulic control system of a transmission.

A similar approach can be done by regulating main pressure and communicating to the controller 216 when main pressure reaches its regulation point. An example of this is shown in FIG. 3. Here, an embodiment of a hydraulic system 300 includes the pressure switch 218 in communication with the lube regulator valve 214. In addition, a second pressure switch 302 is disposed in communication with the main regulator valve 204. Therefore, as main pressure regulates and the main regulator valve 204 moves to its regulated position, the second pressure switch 302 can send a signal to the controller 216 via communication link 304. With both pressure switches, the controller 216 can more accurately control the needs of the hydraulic system 300 by controllably actuating the pump control solenoid 224 and thereby controlling pump flow.

In an alternative embodiment, a hydraulic system may only include the pressure switch 302 disposed in communication with the main regulator valve 204. In a different embodiment, a second pump may be disposed either along flow path 236 or flow path 238 to further facilitate fluid flow through the system. This second pump (not shown) may be referred to as a lube pump that can provide higher flow but lower pressure.

One of the advantages of the hydraulic control system in FIGS. 2 and 3 is the ability to control fluid temperature in the system. As fluid passes through the cooler circuit 210 it enters the lube circuit 212 and builds lube pressure. It is desirable to build lube pressure and satisfy the lube circuit 212 as quickly as possible. Once lube pressure regulates, it can also be desirable to maintain or control fluid temperature passing through the different circuits. To do so, a temperature sensor 200 is disposed in fluid communication with the sump 226. The temperature sensor 220 can also be electrically coupled to the controller 216 via communication path 246. In some instances, a transmission may operate efficiently such that the fluid temperature operating therein is cooler than desired. This may increase spin losses in the transmission. In other instances, the transmission may be operating where the fluid temperature is hot, which can negatively impact different hardware operating in the transmission. Therefore, an ideal temperature or temperature range may be programmed into the controller 216 for maintaining or controlling the fluid temperature at or within the desired range.

During operation, the temperature sensor 220 can communicate a current, real-time fluid temperature to the controller 216 via communication link 246. In turn, the controller 216 can controllably actuate the pump control solenoid 224 to adjust pump displacement. By adjusting pump displacement, fluid flow can be controlled from the pump and through the cooler circuit 210. In other words, the pump control solenoid 224 can effectively control cooler flow through the cooler circuit 210 until the temperature sensor 220 detects a fluid temperature that either meets the desired temperature or falls within the desired temperature range. Thus, if the fluid temperature is greater than a desired temperature, the hydraulic control system can increase the fluid flow through the cooler until the fluid temperature decreases to within a desired range. Moreover, if the fluid temperature is cooler than the desired temperature, the hydraulic control system can reduce fluid flow through the cooler circuit 210 until the fluid temperature increases. The adjusted fluid flow through the cooler circuit 210 can be controlled by the pump control solenoid 224 to controllably adjust the fluid temperature operating within the transmission.

Besides controlling temperature, the pump control solenoid 224 can also adjust pump flow based on demand. If pressure throughout the lube circuit 212 is regulated, the pump control solenoid 224 can reduce pump flow so that "extra" or "excess" flow is reduced, thereby reducing spin losses. Thus, it can be desirable for the controller 216 to know when lube pressure and main pressure are regulated so that transmission spin losses and efficiency can be improved.

Another aspect to this is being able to adapt to leakage in the hydraulic system. Leakage can vary from transmission to transmission, and this is particularly the case for pump leakage and leakage in the controls. A pump may vary due to side clearances, for example. In any event, the regulation point of both main pressure and lube pressure may differ between hydraulic systems due to the difference in leakage of both systems.

Figure 4:
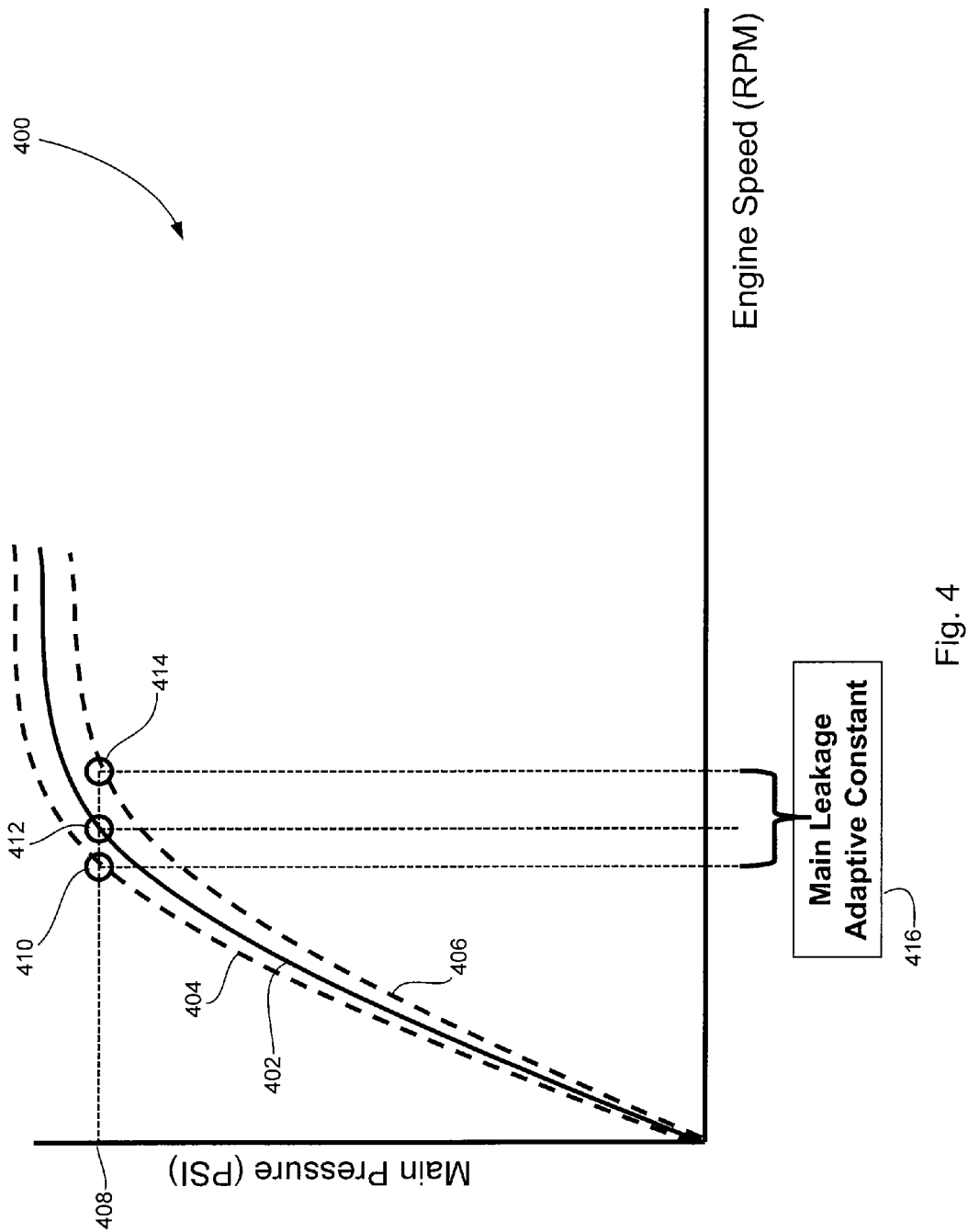
FIG. 4 is a graphical representation of a leakage adaptive profile for a main circuit pressure.

Referring to FIG. 4, for example, a graphical representation 400 of main pressure as a function of input or engine speed is shown. Here, as engine speed increases, main pressure also increases. A nominal curve 402 is shown as being indicative of a nominal or average hydraulic system. A first curve 404 and a second curve 406 are also shown where the nominal curve 402 is disposed therebetween. The first curve 404 may represent a hydraulic system with a minimum amount of leakage, and the second curve 406 may represent a hydraulic system with a maximum amount of leakage.

In FIG. 4, there is a defined regulation pressure 408 that is reached at or about a specific engine speed. As engine speed increases, main pressure also increases until it reaches the regulation point. Once main pressure reaches its regulation point, the main regulator valve 204 moves to its regulation position and the pressure switch 302 can detect this position. The nominal curve 402 reaches regulation at a nominal regulation point 412. Similarly, the first curve 404 reaches regulation at a first regulation point 410 and the second curve 406 reaches regulation at a second regulation point 414. As shown, each curve reaches its corresponding regulation point at a different engine speed, thereby illustrating a variance 416 in leakage adaptive. As will be described, a main pressure leakage adaptive constant may be determined based on the engine speed at which point the main pressure for a hydraulic system reaches its regulation point. As this will be a factor dependent on the leakage of the system, it will be necessary for the controller 216 to learn and understand the leakage and restrictions of the system.

Figure 5:
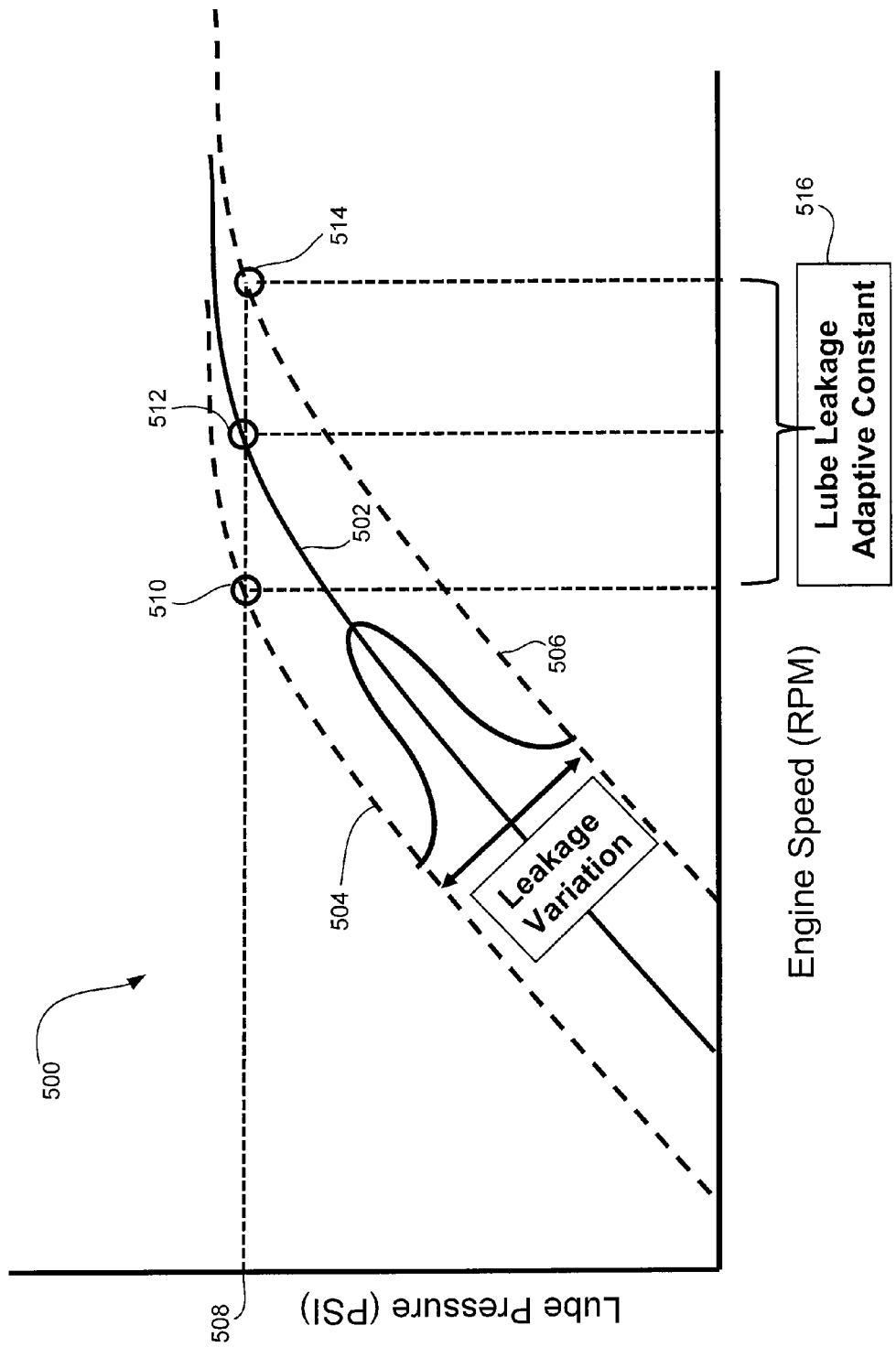
FIG. 5 is a graphical representation of a leakage adaptive profile for a lube circuit pressure.

As previously described, engine speed may continue to increase even after main pressure regulates, and the main regulator valve directs the additional fluid to the converter circuit 208, cooler circuit 210, and lube circuit 212. As lube pressure builds, it too regulates and the pressure switch 218 can detect this regulation point and send a signal to the controller 216 indicating this condition has been reached. In FIG. 5, a graphical representation 500 is shown of lube pressure as a function of engine speed. Here, as engine speed increases, lube pressure also increases. A nominal curve 502 is shown as being indicative of a nominal or average hydraulic system. A first curve 504 and a second curve 506 are also shown where the nominal curve 502 is disposed therebetween. The first curve 504 may represent a hydraulic system with a minimum amount of leakage, and the second curve 506 may represent a hydraulic system with a maximum amount of leakage.

Lube pressure continues to increase as engine speed increases, and like main pressure, reaches its regulation point 508 at a defined engine speed. The nominal curve 502 reaches regulation at a nominal regulation point 512. Similarly, the first curve 504 and second curve 506 reach regulation at a first regulation point 510 and a second regulation point 514, respectively. As shown, each curve reaches the regulation pressure 508 at different engine speeds, thereby indicating a variance 516 in leakage adaptive. From this, a lube pressure leakage adaptive constant may be determined as a function of engine speed and the lube pressure regulation point for the given hydraulic system.

As shown in FIGS. 4 and 5, at a given set of conditions including engine speed and temperature, a lube regulator valve 214 and main regulator valve 204 will stroke to regulated positions for a nominal hydraulic system. Due to leakage and variation in each hydraulic system, however, both valves may stroke to their respective regulation positions at a different engine speed than the nominal system. For instance, if there is more leakage in one hydraulic system, it may take longer to build main and lube pressures and therefore the pressures may not regulate until at a higher engine speed. Alternatively, if there is less leakage, the main pressure and lube pressure may regulate quicker than the nominal system, and thus at a reduced engine speed. From the systems of FIGS. 2 and 3, the point at which lube pressure regulates can be detected and communicated to the controller 216. As a result, the controller 216 can make necessary adjustments to pump flow and other outputs in the system to compensate for leakage and variance in the system. For purposes of this disclosure, this is called leakage adaptive.

The controller can learn a leakage adaptive constant for either or both main pressure and lube pressure. Once the leakage adaptive constant is known, particularly for lube pressure, the controller 216 can make the necessary adjustments to the system and predict flows and pressures of the system under most conditions. Moreover, once the lube circuit is satisfied and lube pressure regulates, additional fluid pumped by the variable displacement pump into the lube circuit 212 can be directed to sump 226. Fluid pressure and flow can be controlled under different transient conditions, as well as fluid temperature can be controlled by adjusting pump flow.

The controller 216 can learn and store the different regulation points for each condition under which main pressure and/or lube pressure regulates (e.g., when ascending an incline, filling a clutch, cruise-like conditions, stop-and-go conditions, etc.). The controller 216 can create tables and store the regulation values based on temperature, speed, etc. As the same condition is repeated, the controller 216 can determine if main or lube pressure regulated at about the same point as done previously. In addition, the controller 216 can operably control the pump control solenoid 224 to command a certain flow characteristic or profile based on previously learned conditions. The controller 216 can also determine if the pressure switch 218, 302 triggered a signal thereto based on regulation of lube pressure or main pressure. In the event the pressure has not regulated, the controller 216 can continuously adapt and relearn to changing conditions. While leakage may or may not vary under most circumstances, temperature variation may cause the greatest variation or change in leakage in the system. The controller 216 therefore can continuously learn and adapt to temperature variation and other changes in the hydraulic system.

Another aspect to leakage adaptive is prognostic control. For a given set of conditions, the leakage adaptive constant for either main pressure or lube pressure should generally not change substantially unless there is an issue in the hydraulic system. In FIG. 5, for example, suppose the regulation point for lube pressure is 1000 RPM for a certain condition (e.g., at a defined temperature, etc.). As the controller 216 continuously monitors when the pressure switch 218 detects movement of the lube regulator valve 214 to its regulated position, the controller 216 can further detect changes in the regulation point. For instance, if engine speed continuously increases before the regulation point is reached, the controller 216 may detect a problem in the hydraulic system. A broken seal or damage to the variable displacement pump may cause an increase in leakage in the system, thereby resulting in the lube pressure (or main pressure) regulation point changing with increasing engine speed.

In the event of a possible leakage induced by a broken seal or other problem in the hydraulic system, the controller 216 can be programmed or include instructions to detect the problem. For instance, the controller 216 can include instructions that indicate a threshold or threshold range. This threshold or range may be based on a specific engine speed at which lube or main pressure regulates. Alternatively, this threshold or range may be based off a degree of change in the regulation point. Moreover, this threshold or range may be based off how quickly the regulation point changes (i.e., a time-based consideration). The controller 216 may track the number of times the lube pressure or main pressure regulates and detect the change in regulation point based off a count or quantity of regulation detections. The pressure switch 218 provides an input to the controller 216 to detect when the lube pressure regulates and the second pressure switch 302 provides another input to the controller 216 for when main pressure regulates. Therefore, in the example above, if lube pressure suddenly regulates at 2000 RPM rather than 1000 RPM, the controller 216 can detect this and trigger an alarm or diagnostic code. Depending on the severity of the leak, the controller 216 may further limit the functionality of the transmission to prevent further damage to the transmission.

A further aspect of the present disclosure is the ability to characterize both the fluid flow and pressure throughout the entire hydraulic system. In this aspect, a model-based hydraulic control system can include a learning feature to better understand the leakage in any given transmission or hydraulic system so that the amount of fluid flow and pressure needed under any condition can be provided without substantial delay. More particularly, the controller can predetermine leakage in the hydraulic system, and based on the amount of leakage therein, control the output of the variable displacement pump to accurately provide fluid flow and pressure throughout the system under any condition. In doing so, the inherent time delay or response of the pump can be overcome by compensating for leakage and geometrical restrictions in the system. In this disclosure, the model-based approach can be referred to as a "feed forward" model.

As previously described, the combination of the pressure switches 218, 302 and pump control solenoid 224 of FIGS. 2 and 3 can allow the "feed forward" model to be incorporated into any given hydraulic system. Through the addition of the pump control solenoid 224, the main "decrease" pressure leading to the decrease port of the pump can be accurately controlled such that, for example, if the controller predicts an upcoming shift, the controller 216 can controllably actuate the solenoid 224 to increase pump flow before a clutch fill command is initiated. In doing so, the increased pump flow before commanding a clutch fill can allow the hydraulic system to meet the demand of filling the clutch with a sufficient amount of fluid without de-stabilizing the system due to a lack of fluid supply and delayed time response of the pump. Moreover, many of the issues due to the undershoot and overshoot of fluid flow can be avoided via this approach.

In the proposed feed forward model, the controller can receive a plurality of inputs, such as engine or input speed, transmission range or gear ratio, and fluid temperature (at sump). Additional inputs can be received or calculated based on the leakage of the system. Once certain inputs are received by the controller, the controller can learn and/or predict the requirements for fluid flow and fluid pressure such that main pressure can be controlled via the main pressure solenoid 222 and fluid flow can be controlled by the pump control solenoid 224. As a result, not only is the fluid supply accurately provided to fill clutches, for example, but the controller can also provide the accurate amount of fluid to the clutches and other locations in the hydraulic system to improve shift quality and leakage. This can reduce or remove excess fluid flow that otherwise may increase spin losses in the transmission.

The feed forward model is a characterization of the hydraulic system and monitoring various inputs and operating conditions so that flow and pressure requirements can be predicted and controlled accordingly. As described, this can be incorporated into a closed loop control system such that the controller can make adjustments to flow and pressure requirements based on changes to system leakage and the inputs. In other words, the controller can operate in accordance with the feed forward model by anticipating what various input values should be under a given set of conditions, and then if the actual input value deviates from its predicted value, the controller can continuously make adjustments to the estimated value in real-time rather than react under conventional circumstances.

Figure 6:
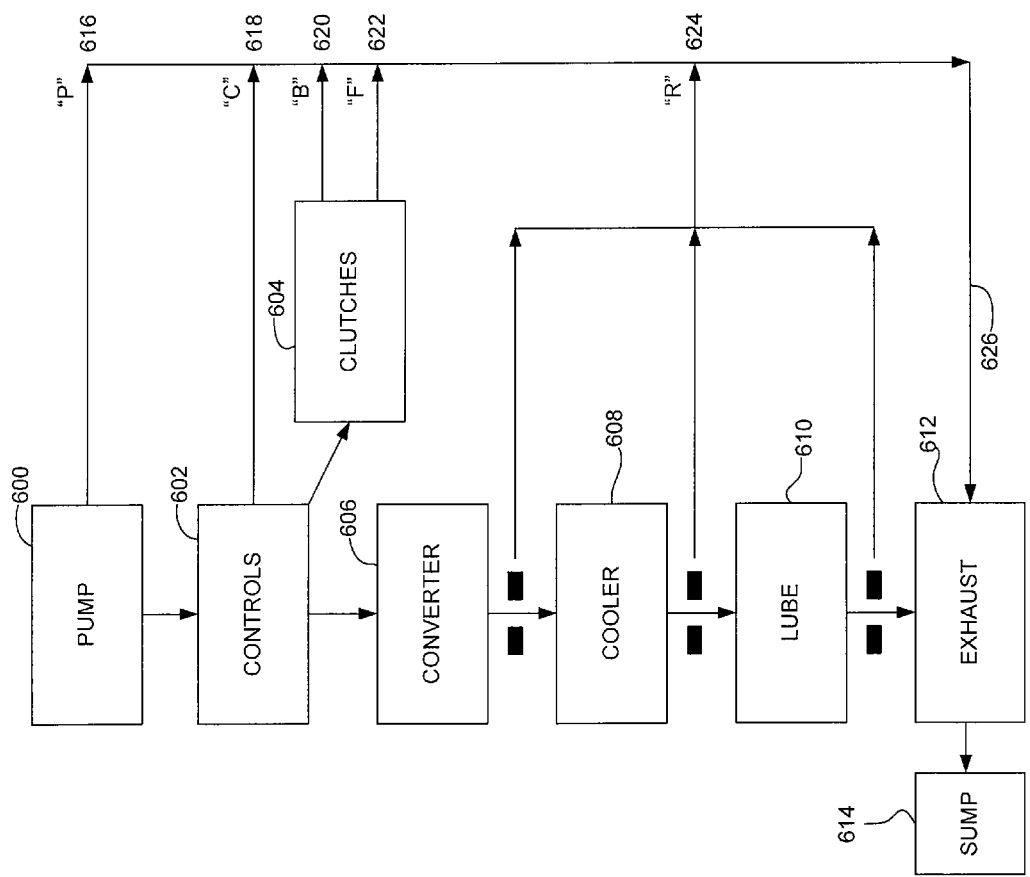
FIG. 6 is an exemplary schematic of a feed forward model for controlling pump flow in a transmission.

To better understand the feed forward model approach, the controller can first learn and determine the leakage adaptive value for the particular hydraulic system. In FIGS. 6-7, an exemplary embodiment of a feed forward model is shown. Here, the controller (i.e., the transmission controller or control unit) is a provided a means for determining a leakage constant for the hydraulic system in the form of a flow model 600. The flow model 600 considers leakage and geometrical restrictions in the different circuits that define the hydraulic system. For instance, the flow model 600 can characterize the leakage from a pump 602 and controls 604. As shown, fluid is transferred from an output of the pump 602 to the controls 604, which as described above can be part of the main circuit. From the controls 604, fluid can be supplied to clutches 606.

Once the main circuit is satisfied and main pressure regulates, fluid is supplied to the converter circuit 608, cooler circuit 610, and lube circuit 612. Once the lube circuit 612 is satisfied and lube pressure regulates, any additional fluid can be exhausted or returned to sump 614 (i.e., labeled "Exhaust" in FIG. 6). This excess fluid, which is shown by arrow 626 in FIG. 6, can be referenced as "total unusable" fluid since the main circuit and lube circuit are satisfied. In one aspect, it can be desirable for the controller to control pump flow so as to minimize the amount of "total unusable" fluid to improve transmission performance. This can be controlled by controlling pump displacement via actuation of the pump control solenoid as previously described. In another aspect, the leakage adaptive parameter or pump leakage factor 616 can be calculated by the controller by removing this unusable quantity of fluid for a given set of conditions.

Once the controller determines that lube pressure has regulated, the controller can determine the leakage for the hydraulic system. As shown in FIG. 6, the pump 602 can contribute to the overall system leakage by producing pump leakage "P" 616. Moreover, there is controls leakage "C" 618, and in addition, the clutches 606 contribute both bleeds "B" 620 and fill flow "F" 622. The converter circuit 608, cooler circuit 610, and lube circuit 612 each contribute flow restrictions 624 based on geometry (e.g., orifice size, bleed diameters), converter type, and converter mode.

Referring to FIG. 7, a plurality of information 700 in the form of tables can be downloaded and stored in the memory unit of the controller. In table 702, for example, the controller can determine the restriction value for the converter circuit 606 based on the mode of which the torque converter is operating. For instance, the torque converter may include a lockup clutch such that the converter operates in either a converter mode or lockup mode.

In table 704, the controller can retrieve individual restriction diameters for the converter circuit 606, based on either converter mode or lockup mode, the cooler circuit 608, and the lube circuit 610. The summation of the restrictions of the converter circuit 606, cooler circuit 608, and lube circuit 610 can provide a total restriction value 624.

In table 706, the controller can retrieve bleed orifices for each clutch based on transmission range or gear ratio. The bleeds are generally necessary to facilitate the release or exhaust of air from the clutches. As shown in table 706, the bleed orifice area values 620 are arranged based on the transmission range or gear ratio, and these values 620 can be derived from individual bleed diameters for each clutch in the transmission. The individual bleed diameters may be retrieved from table 712. In one aspect, there may be two clutches engaged for a single range. From the individual bleed diameters, the bleed orifice area values 620 in table 706 can be determined. In a different aspect, there may be a different number of clutches engaged for a single range. For instance, it may be possible only clutch is engaged. Alternatively, three or more clutches may be engaged for a given range. In any event, the individual bleed diameters for each clutch can be used to determine the combined bleed orifice area 620 for each given range or gear ratio.

In table 708, the controller can retrieve the controls leakage 616 for each given range or gear ratio. In one aspect, the values for the controls leakage 616 can be predetermined and stored in the memory unit of the controller, similar to the bleed orifice area values 620. The controller can retrieve additional information from table 712, including individual clutch fill flow 620 and fluid viscosity factors. Lastly, in table 710, the controller can retrieve a pump displacement value and then determine the overall pump leakage factor 616. In at least one aspect, the pump leakage factor 616 can be an overall summation of the leakage/fluid demands of each circuit or sub-system in the transmission.

To accommodate for the fluid viscosity, each of the tables in FIG. 7 may include different values dependent upon various temperatures or temperature ranges. For instance, one value may correspond to a fluid temperature within the range of 75° C. and 90° C., whereas a different value may correspond to a fluid temperature within the range of 90° C. and 105° C. There may be other variations in the values besides those based on fluid temperature, but fluid temperature does often impact fluid viscosity the greatest.

Pump leakage 616 can often be a big factor or component in the overall leakage in the hydraulic system. However, once the lube regulation point is known or determined, the controller can calculate the overall leakage of the system in accordance with the flow model of FIG. 6 and the tabular information 700 of FIG. 7. The leakage adaptive parameter is based on pump speed (i.e., input speed), fluid temperature, clutch fill, and the like. Once these are known, the flow requirements of the system can be determined and fulfilled as needed.

Figure 8:
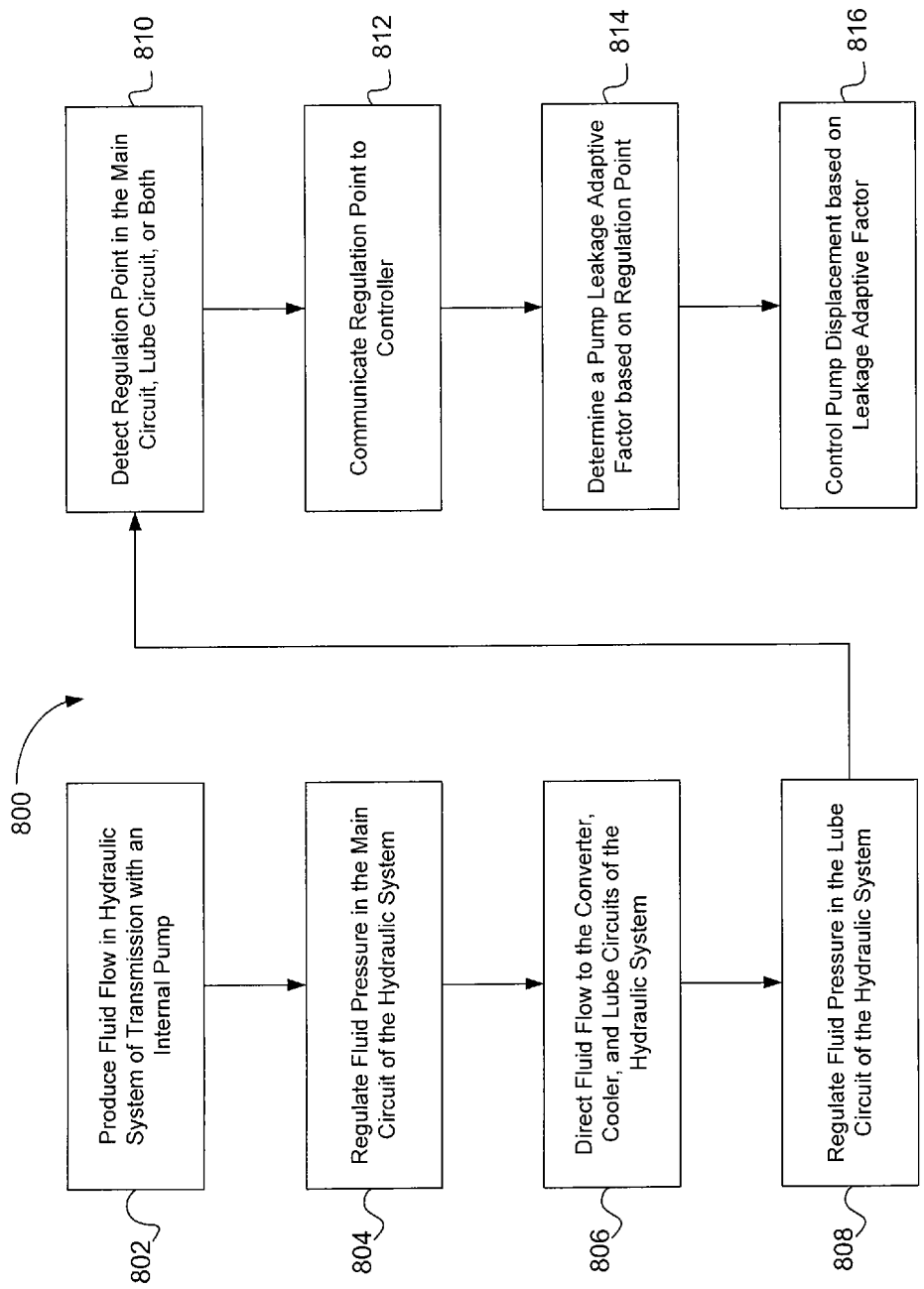
FIG. 8 is an exemplary flowchart of a method for controlling pump flow using the model of FIG. 6.

To do so, the controller can use the leakage adaptive parameter or pump leakage factor to adjust pump displacement. This is achieved via the pump control solenoid, which as described above, can control the "decrease" pressure of the variable displacement pump. By controlling this "decrease" pressure, the pump displacement can either be increased or decreased. To better illustrate this process, reference is hereby made to FIG. 8. In FIG. 8, a control process is provided for controlling pressures and flow throughout the hydraulic system of the transmission. This process 800 illustrates several steps that are only intended to be exemplary, and not limiting. For instance, other methods may include more or less steps than that shown in FIG. 8. As a result, the method or process of FIG. 8 is an exemplary embodiment that illustrates the overall process of regulating pressure within the different circuit or sub-systems of the transmission so that flows and pressures can be desirably determined based on future demand.

In FIG. 8, a first step 802 is achieved by producing fluid flow in a hydraulic system of the transmission. Here, this is generally done by the variable displacement pump that can be integrally disposed within an outer housing of the transmission. However, as described above, alternative embodiments may include a second pump disposed before or after the cooler circuit to provide additional flow. Other embodiments may include a hydraulic pump disposed outside of the transmission to further facilitate fluid flow in the transmission. In this example, the variable displacement pump can produce fluid flow and pressure in the main circuit of the transmission.

In step 804, the pressure in the main circuit, i.e., main pressure, can reach a regulation point. As shown in FIG. 3, a pressure switch 302 can be disposed in communication with the main regulator valve 204 so that as main pressure regulates, the pressure switch 302 can send a signal along communication link 304 to the controller 216 to alert the controller 216 of this condition. Moreover, once main pressure regulates in step 804, the main regulator valve 204 can stroke to its regulated position so that additional fluid can be directed to the converter circuit 208, cooler circuit 210 and lube circuit 212 in step 806.

As fluid pressure builds in the lube circuit 212, the pressure, i.e., lube pressure, reaches a regulation point in step 808. In doing so, the lube regulator valve 214 can stroke to its regulated position, thereby triggering the pressure switch 218 to detect this position and send a signal to the controller 216 along communication link 248. At this point, the controller 216 has learned or determined the regulation point in the main circuit, lube circuit, or both (e.g., in the embodiment of FIG. 3) in accordance with step 810. Moreover, as described, the different pressure switches can detect these regulation points and communicate this information via signals to the controller 216 in step 812.

In step 814, the controller can determine a pump leakage adaptive factor based on the regulation points, and primarily based off the lube regulation point. As described above with reference to FIGS. 6 and 7, the controller can retrieve various inputs (e.g., controls leakage values, bleeds, restrictions, etc.). Many of these inputs will be dependent upon temperature, range, and converter mode. The controller can receive this type of information according to various known means, including those previously described. Once the controller has retrieved all of the input data, it can compute the pump leakage factor or leakage adaptive parameter.

As previously described, the leakage adaptive parameter is a leakage adjustment variable for the overall leakage in the transmission. Once the controller determines this parameter, it can input this value into a pump supply equation to determine flows and pressures throughout the hydraulic system. In one non-limiting aspect, a transmission with nominal hardware may have a leakage factor of 0.091. If a transmission has more leakage than the nominal transmission, the leakage factor or parameter will likely adapt to a greater value, e.g., 0.105. Likewise, if a transmission has less leakage than the nominal transmission, the leakage factor or parameter will likely adapt to a lesser value, e.g., 0.085. This can be seen in FIG. 5, for example, where the nominal transmission may have a leakage adaptive factor of 0.091 that reaches the lube pressure regulation point 512 at a lower engine speed than the "more leakage" transmission that may have a leakage adaptive factor of 0.105 and reaches its lube pressure regulation point 514 at a higher engine speed.

Therefore, a transmission that has more leakage will likely adapt to a higher leakage adaptive parameter compared to the nominal transmission, whereas the transmission that has less leakage will likely adapt to a lower leakage adaptive parameter. The leakage adaptive parameter, however, may change over time if there is additional leakage in the transmission. For instance, if the controller determines that the downstream pressure switch 218 toggles or moves earlier or later than expected, the leakage adaptive parameter will adjust accordingly. As a result, the controller can calculate the flow demands of the transmission under different conditions, and based on this feed forward model, the controller can then optimize the displacement of the variable displacement pump in step 816. Moreover, as the controller calculates the flow demands of the transmission, the controller can operably control the output of the pump control solenoid to adjust pump displacement as needed.

Figure 9:
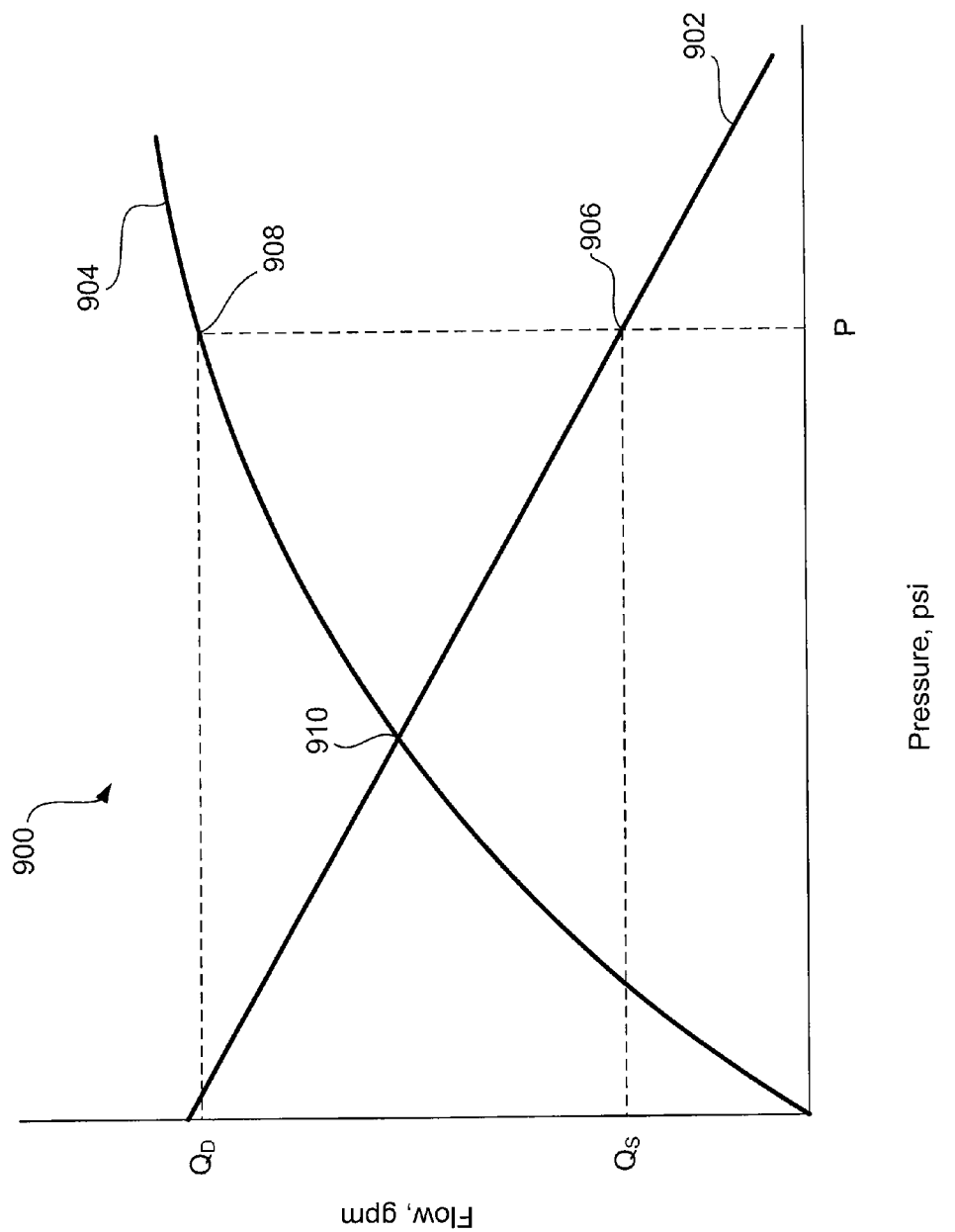
FIG. 9 is a graphical representation of flow demand and flow supply curves for a shift between ranges.

In FIG. 9, an exemplary graphical representation 900 is provided to illustrate how the control system can adjust pump flow based on flow demands during a shift. In FIG. 9, an exemplary supply curve 902 and demand curve 904 are provided for a given set of conditions. As described above, there are various inputs necessary for determining flow requirements throughout the system. This includes engine speed, transmission sump temperature, main modulation state, transmission range, and whether a clutch is being filled. Based on these inputs, the controller can calculate the supply of fluid flow from the pump based on the following supply equation:

$$\text{Supply Flow}(Q_S) = (N_E \times PD) - KP/v$$

where $N_E$ is engine speed, PD is pump displacement, P is pressure, v is fluid viscosity, and K is a constant based on the leakage adaptive factors. K can be a function of pump leakage 616, controls leakage 618, and leakage due bleed holes 620.

Moreover, the variable K can also be a function of range. The controller may have a lookup table stored in its memory in which K is adjusted by a correction factor on the basis of transmission range. For instance, if the transmission range is reverse, the variable K may be adjusted by a correction factor of 0.01. Alternatively, if the transmission range is second, the variable K may be adjusted by a correction factor of 0.045. Again, these correction factors can be predetermined and stored in the memory unit of the transmission controller.

In FIG. 9, the supply curve 902 is shown as having a negative slope due in part to the leakage of the pump, controls, bleed orifices, seals, etc. In a perfect flow model without leakage, the pump flow would be substantially constant at any given speed, but the model as described in the present disclosure can accommodate for the various leakages in the system. The flow demand curve 904 is also shown. At one point 910 in FIG. 9, the supply curve 902 and demand curve 904 intersect, thereby representing a certain pressure at which the flow demanded is the same as the flow being supplied. However, at another pressure represented by "P" in FIG. 9, the supply flow $Q_S$ is less than the demand flow $Q_D$ (i.e., difference between points 906 and 908). As shown, the pump flow 906 being supplied during the shift is insufficient to meet the flow demand 908 to fill the oncoming clutch during the shift. As such, the controller can calculate this demand for the clutch fill as follows:

$$\text{Demand Flow} = 31 * A * \sqrt{(\Delta P)}$$

where A is the area of the feed orifice in the clutch and $\Delta P$ is the difference between the pressure, P, and the return spring of the clutch. The controller therefore can determine both the fluid demand for filling the oncoming clutch and the fluid supply being output by the pump.

On the basis of the pump supply and flow demand equations above, the controller can adjust the pump supply to meet the flow demand by controllably adjusting the pump displacement as described in this disclosure. In other words, the controller can receive the necessary inputs as described above and retrieve constants and other variables for determining the leakage adaptive parameter. Based on transmission range and temperature, the controller can obtain viscosity (as a function of temperature) and correction factors to determine pump supply. Thus, if the controller determines that for a given pressure the pump supply is insufficient for the flow demand to fill an oncoming clutch, the controller can controllably adjust pump displacement until the supply flow meets the required demand flow. Stated another way, by adjusting pump displacement, the supply flow curve 902 in FIG. 9 can be moved vertically until the supply flow point 906 intersects with the demand flow point 908. With the controller being able to adjust the supply flow to meet the flow demands during a shift, the controller can effectively improve shift quality and durability of the transmission.

Figure 11:
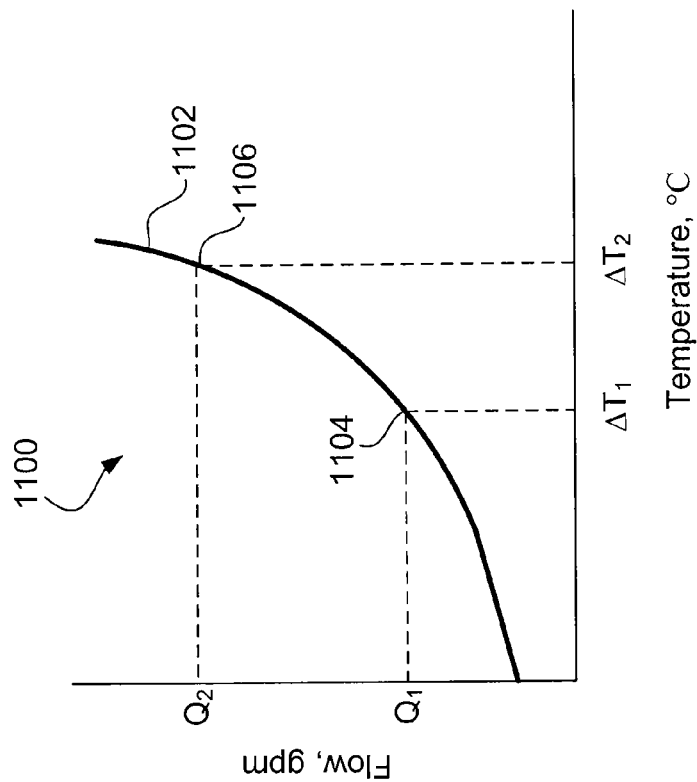
FIG. 11 is a graphical representation of a flow curve based on temperature adjustment.
Figure 10:
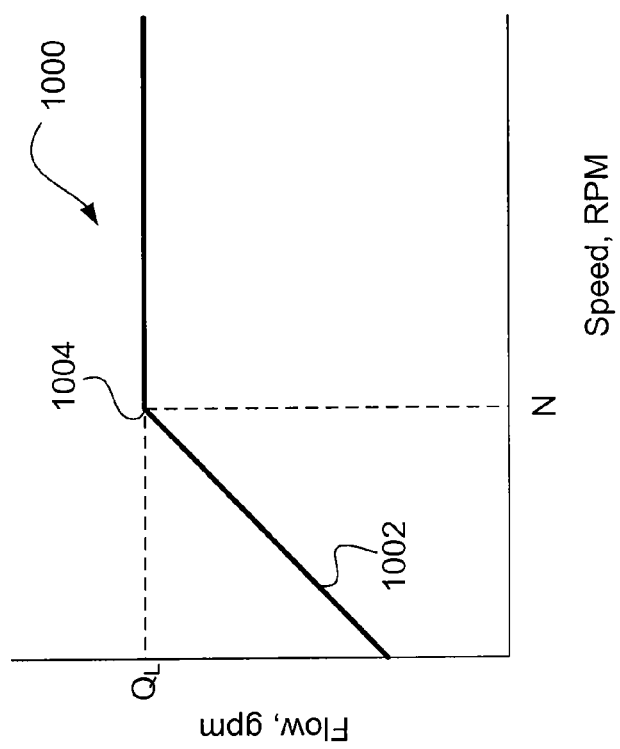
FIG. 10 is a graphical representation of a flow curve to accommodate lube flow.

Referring to FIGS. 10 and 11, the controller can also adjust the pump supply when the transmission is operating between shifts. Here, the controller can operate a closed loop control system by monitoring flow requirements to satisfy the lube circuit and maintain sump temperature at or near a desired temperature. To do so, the controller can determine how much pressure is needed to keep engaged clutches from slipping for a given amount of engine torque. The pressure can be regulated by the main regulator valve, as described above, to maintain clutch capacity. Once the controller has determined the requisite amount of pressure, any excess fluid supply can be directed to the converter, cooler circuit, and lube circuit.

The controller can be programmed to determine the amount of flow that is required to satisfy the requirements of the lube circuit. For instance, a plurality of flow requirement values may be provided in the form of a lookup table or graph. In FIG. 10, an exemplary graphical representation 1000 is provided for determining flow requirements to satisfy a lube circuit. Here, the flow requirements can be set forth on the basis of a transmission speed, i.e., input speed or output speed. The controller can receive or determine the input or output speed of the transmission, and based on this speed, retrieve the required flow requirement to meet the needs of the transmission lube circuit. In FIG. 10, for example, a flow profile 1002 is shown as a function of speed. The flow requirement increases as speed increases, but at a predetermined speed, N, the flow requirement can level off and remain substantially constant for increasing speeds. For instance, the predetermined speed, N, may refer to 1500 RPM for the transmission output speed. At 1500 RPM, the flow requirement, $Q_L$, is indicated by point 1004 on the flow profile 1002. In this instance, if the controller determines that the output speed, N, is 1500 RPM, the controller can retrieve the flow requirement value $Q_L$ from the graphical representation. If the speed is different, the controller can interpolate between values or pull a defined value from the flow profile 1002.

In addition, the controller can monitor the transmission sump temperature, and based on this temperature adjust flow through the cooler circuit. For instance, in FIG. 11 a different graphical representation 1100 is shown of a flow profile 1102 as a function of temperature change. The controller can continually monitor sump temperature in accordance with the methods described herein. Moreover, the controller can be preprogrammed or have a desired or threshold temperature stored in its memory unit. Alternatively, the sump temperature may be set by a vehicle operator, for example. In any event, the controller can be provided with a desired or threshold sump temperature and make adjustments to the hydraulic control system to change the sump temperature, as needed.

In FIG. 11, a first temperature point 1104 and a second temperature point 1106 are shown along the flow profile 1102. In this embodiment, the first temperature point 1104 corresponds to a difference between desired and actual temperature, $\Delta T_1$. The second temperature point 1106 refers to a second difference, $\Delta T_2$. Each of the changes in temperature corresponds to a different flow. For instance, the first change in temperature $\Delta T_1$ corresponds to a first flow requirement, $Q_1$, and the second change in temperature $\Delta T_2$ corresponds to a second flow requirement, $Q_2$.

Based on the flow profile 1102 of FIG. 11, if the desired or threshold temperature is $T_T$ but the actual sump temperature is lower than the threshold, the controller may not adjust the supply flow. However, if the actual sump temperature is greater than the threshold temperature, the controller can determine the difference between the actual and threshold temperatures. Based on this difference, the controller can determine the flow requirement from the graphical representation 1100 of FIG. 11 to reduce the sump temperature. This can be achieved by providing additional flow through the cooler circuit, as described above.

Moreover, as described above with reference to FIG. 10, the controller can determine the corresponding pressure for maintaining clutch capacity at a certain engine torque. Alternatively, rather than engine torque, this may be a function of accelerator or throttle pedal position. In any event, the controller can determine the amount of fluid being supplied by the pump at the given pressure using the pump supply equation above.

This supply flow, $Q_S$, corresponds to the amount of flow available to satisfy the converter, cooler circuit and lube circuit. As described, the controller can then determine whether the supply flow, $Q_S$, is sufficient for satisfying lube, converter and cooling, and if not, the controller can then make adjustments to pump displacement to increase flow in the overall system. If, based on current input or output speed, the lube flow requirement, $Q_L$, is less than $Q_S$ and the controller determines the sump temperature is at or less than the threshold temperature, $T_T$, the controller can make further adjustments to reduce flow and provide better fuel economy.

On the other hand, if the lube flow requirement, $Q_L$, is greater than the supply flow, QS, the controller can controllably adjust pump displacement to increase the amount of fluid supplied by the pump to satisfy the needs of the lube circuit. In addition, if the actual sump temperature is greater than the temperature threshold, $T_T$, the controller can compute this difference and use the graphical representation 1100 of FIG. 11 to determine the amount of flow needed to reduce the sump temperature.

Figure 12:
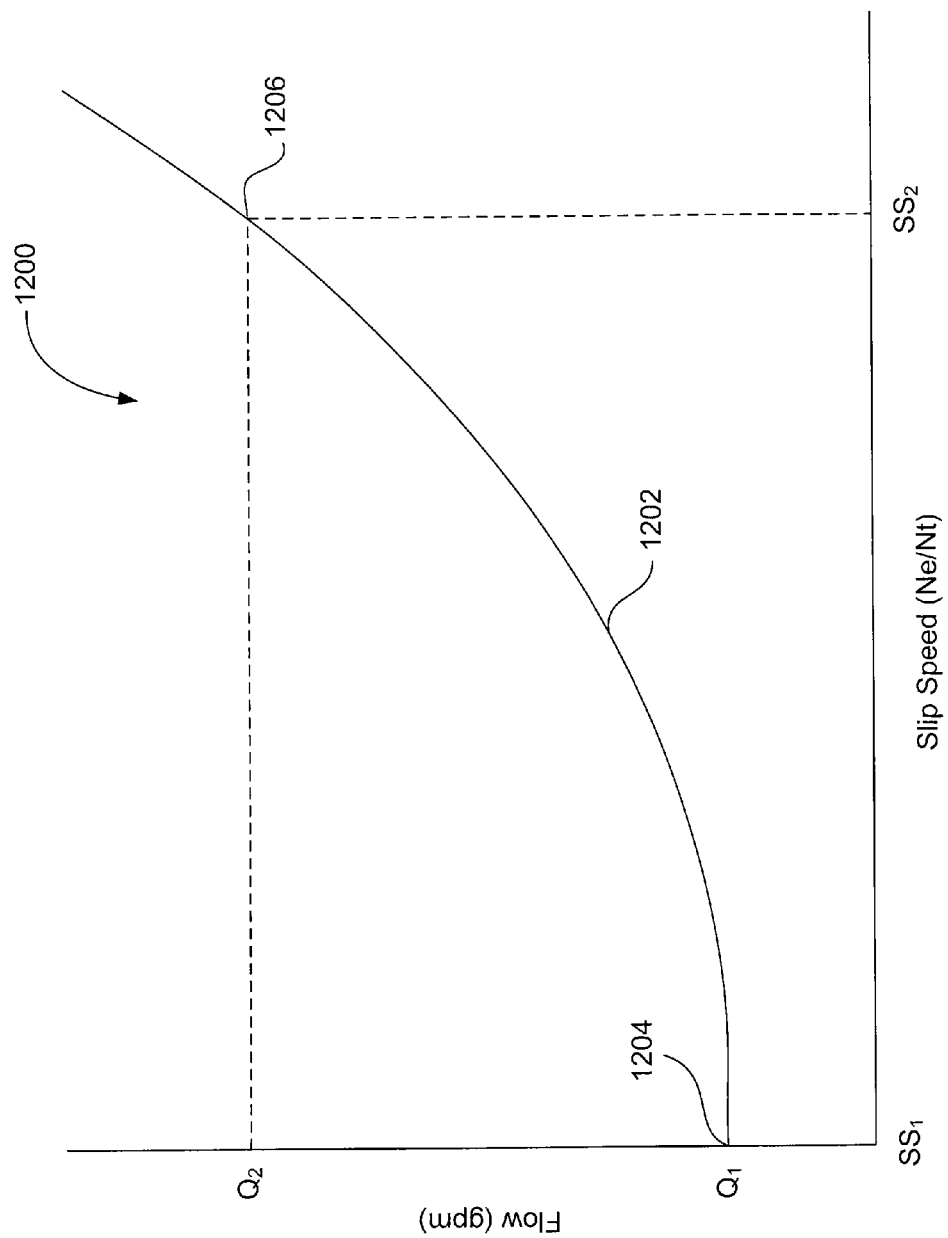
FIG. 12 is a graphical representation of a flow curve based on slip speed across a torque converter.

Referring to FIG. 12, a graphical representation 1200 is provided for a torque converter flow requirement. The torque converter can be a significant heat generator, particularly during instances in which the vehicle is ascending a steep grade or repeatedly launching from a stop. As described above with reference to FIG. 1, torque multiplication occurs through the fluid coupling between the drive unit 102 and transmission 118 such that the turbine shaft 114 is exposed to more torque than is being supplied by the drive unit 102. The torque multiplication is advantageous for transferring torque to the wheels during a vehicle launch, but it also tends to generate the most heat in the torque converter. As a result, it can be desirable to remove or dissipate this heat through the cooler circuit, if possible.

The transmission controller can be used to monitor the amount of heat being generated by the torque converter by monitoring the amount of torque produced by the drive unit (or engine) and detecting or calculating the amount of converter slip. Converter slip can be defined as the ratio of input speed and turbine speed. Stated another way, the converter slip is the speed differential across the torque converter. The controller can receive input torque from the engine or drive unit via a datalink or signal path between the controller and drive unit control circuit (e.g., engine controller). In the event the transmission controller cannot receive the input torque, the controller can calculate the input torque as a function of slip speed.

In FIG. 12, a flow profile 1200 is shown for satisfying a converter flow requirement. Here, the controller can calculate the converter slip speed and then retrieve a desired flow from the graphical representation 1200 of FIG. 12. For example, in FIG. 12, there are a plurality of defined flows along the flow profile 1202, including a first flow $Q_1$ and a second flow $Q_2$. The first flow, $Q_1$, corresponds to point 1204 on the flow profile 1202 at a first slip speed, $SS_1$. Similarly, the second flow, $Q_2$, corresponds to point 1206 on the flow profile 1202 at a second slip speed, $SS_2$. It is to be understood that both slip speed values are only two of a plurality of slip speed values. The controller may interpolate as necessary to determine the desired flow at a different slip speed value. Alternatively, the controller may be programmed with a formula for the flow profile based on slip speed or input torque. In any event, the controller can continuously monitor the slip speed and determine whether additional flow is needed to dissipate the heat generation from the torque converter.

In addition, while only one flow profile 1202 is shown in FIG. 12, there may be a plurality of flow profiles. Each flow profile may be related to a specific position of the accelerator pedal (i.e., throttle pedal position or percentage). Moreover, there may be various curves depending on the type and model of the torque converter. In the event the torque converter includes a lockup clutch, the controller can monitor or detect when the lockup clutch is engaged. When the lockup clutch is engaged, the controller can be programmed to skip the evaluation of the converter flow requirement and only determine the amount of flow required for the lube and cooler circuits.

Thus, on the basis of FIGS. 10-12, the controller can be programmed or instructed to evaluate three flow requirements, i.e., the lube requirement, sump temperature or cooler requirement, and converter flow requirement. In one aspect, the controller can determine which of the three flow requirements is the greatest, and based on this maximum flow, the controller can adjustably control pump displacement to achieve the desired amount of flow. In a different aspect, the controller may sum the three flow requirements, calculate the average, or compute a different desired flow on the basis of the three flow requirements. Moreover, the controller can continuously monitor, calculate, and determine the three flow requirements and make real-time adjustments to pump displacement based on changes to any of the requirements. By adjusting pump displacement, the controller can effectively control the three flow requirements as desired. In doing so, the controller can also improve overall fuel economy of the vehicle.

While the flow requirements for the lube circuit, cooler circuit, and converter are shown in FIGS. 10, 11, and 12 as graphical representations, it is to be understood that these may lookup tables with values for the controller to retrieve. For the lube circuit, the flow required may be provided based on transmission input speed, turbine speed, transmission output speed, torque or shift frequency. Likewise, for the cooler circuit, the flow required to reduce sump temperature may be provided based on a plurality of temperature differences, e.g., in increments of 1-5° C. Similarly, for the converter flow requirement, the flow required to dissipate heat generated in the converter may be provided based on slip speed, input torque, converter model, and/or accelerator pedal position. Once the controller determines the supply flow and the required flow to satisfy each of the requirements of the lube circuit, cooler circuit and converter circuit, the controller can controllably actuate the pump control solenoid to adjust pump displacement. Moreover, this can be part of a closed-loop control where the controller can continuously calculate and determine the flow supply and flow demand of the system and continuously adjust pump displacement to improve fuel economy.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling fluid flow and pressure in a hydraulic system of a transmission, comprising:

providing a controller, a variable displacement pump, a hydraulic controls, a fluid circuit fluidly coupled to the pump, a regulator valve, a pressure switch, and a solenoid for operably controlling pump displacement;

pumping fluid from the pump into the fluid circuit to produce a fluid flow and pressure therein;

regulating the pressure in the fluid circuit at a regulation pressure;

detecting the regulation pressure with the pressure switch and communicating the regulation pressure to the controller;

determining a leakage adaptive factor as a function of the regulation pressure, a pump leakage factor, a hydraulic controls leakage factor, and a plurality of geometrical restrictions in the fluid circuit; and adjusting the displacement of the pump from a first displacement to a second displacement as a function of the leakage adaptive factor.

2. The method of claim 1, further comprising fluidly actuating the regulator valve from an unregulated position to a regulated position in the fluid circuit when the regulation pressure is reached.

3. The method of claim 1, wherein the adjusting step comprises actuating the solenoid from a first electrical state to a second electrical state.

4. The method of claim 1, wherein the determining step comprises determining a transmission input speed, a transmission gear ratio, and a fluid temperature.

5. The method of claim 1, further comprising storing a plurality of factors in a memory of the controller, the plurality of factors including at least one of a converter mode restriction factor, a lockup mode restriction factor, a cooler circuit restriction factor, a lube circuit restriction factor, a clutch bleed factor, a leakage factor for the hydraulic controls, a leakage factor for the pump, a fluid viscosity factor, an individual clutch fill flow factor, and an individual clutch bleed diameter.

6. The method of claim 5, further comprising determining a total restriction factor as a summation of a converter restriction factor, a cooler circuit restriction factor, and a lube circuit restriction factor.

7. The method of claim 1, further comprising determining the pump leakage factor as a function of a pump displacement factor and a leakage factor.

8. The method of claim 1, further comprising:
determining a transmission gear ratio; and
searching a look up table stored in the controller for determining a hydraulic controls leakage factor as a function of transmission gear ratio.

9. The method of claim 1, further comprising:
storing a nominal leakage factor and a threshold factor in the controller;
comparing the leakage adaptive factor to the nominal leakage factor; and
adjusting the pump displacement if a difference between the leakage adaptive factor and nominal factor increases beyond the threshold factor.

10. The method of claim 9, further comprising:
storing the regulation pressure after a first regulation of the fluid circuit as a function of fluid temperature, transmission input speed, and transmission gear ratio;
determining a regulation pressure of the fluid circuit after a second regulation of the fluid circuit and store the second regulation pressure in the controller;
detecting a difference between the regulation pressure after the first regulation and the regulation pressure after the second regulation; and
adjusting the displacement of the pump to reduce the difference between the regulation pressure after the first regulation and the regulation pressure after the second regulation.

11. The method of claim 1, further comprising triggering the pressure switch from a first position to a second position once the regulation pressure is detected.

12. A method of controlling fluid flow and pressure in a hydraulic system of a transmission, comprising:
providing a controller, a variable displacement pump, a first fluid circuit fluidly coupled to the pump, a second fluid circuit fluidly coupled to the pump and the first fluid circuit, a first regulator valve, a second regulator valve, a first pressure switch, a second pressure switch, and a solenoid for operably controlling pump displacement;
pumping fluid from the pump into the first fluid circuit to produce a fluid flow and pressure therein;
regulating the pressure in the first fluid circuit at a first regulation pressure;
detecting the first regulation pressure with the first pressure switch and communicating the first regulation pressure to the controller;
directing fluid flow from the pump to at least the second fluid circuit;
regulating the pressure in the second fluid circuit at a second regulation pressure;
detecting the second regulation pressure with the second pressure switch and communicating the second regulation pressure to the controller;
determining a leakage adaptive factor as a function of the regulation pressure, a pump leakage factor, a hydraulic controls leakage factor, and a plurality of geometrical restrictions in the first and second fluid circuits; and
adjusting the displacement of the pump from a first displacement to a second displacement as a function of the leakage adaptive factor.

13. The method of claim 12, wherein the directing step comprising moving the first regulator valve from an unregulated position to a regulated position.

14. The method of claim 13, further comprising fluidly actuating the first regulator valve to the regulated position when the first regulation pressure is reached.

15. The method of claim 12, further comprising fluidly actuating the second regulator valve to its regulated position when the second regulation pressure is reached.

16. The method of claim 12, wherein the adjusting step comprises actuating the solenoid from a first electrical state to a second electrical state.

17. The method of claim 12, wherein the determining step comprises determining a transmission input speed, a transmission gear ratio, and a fluid temperature.

18. The method of claim 12, further comprising storing a plurality of factors in a memory of the controller, the plurality of factors including at least one of a converter mode restriction factor, a lockup mode restriction factor, a cooler circuit restriction factor, a lube circuit restriction factor, a clutch bleed factor, a leakage factor for the hydraulic controls, a leakage factor for the pump, a fluid viscosity factor, an individual clutch fill flow factor, and an individual clutch bleed diameter.

19. The method of claim 18, further comprising determining a total restriction factor as a summation of a converter restriction factor, a cooler circuit restriction factor, and a lube circuit restriction factor.

20. The method of claim 12, further comprising determining the pump leakage factor as a function of a pump displacement factor and a leakage factor.

21. The method of claim 12, further comprising:
determining a transmission gear ratio; and
searching a look up table stored in the controller for determining a hydraulic controls leakage factor as a function of transmission gear ratio.

22. The method of claim 12, further comprising:
storing a nominal leakage factor and a threshold factor in the controller;
comparing the leakage adaptive factor to the nominal leakage factor; and
adjusting the pump displacement if a difference between the leakage adaptive factor and nominal factor increases beyond the threshold factor.

23. The method of claim 22, further comprising:
storing the first regulation pressure after a first regulation of the first fluid circuit as a function of fluid temperature, transmission input speed, and transmission gear ratio;

determining a regulation pressure of the first fluid circuit after a second regulation of the first fluid circuit and storing the regulation pressure in the controller;

detecting a difference between the first regulation pressure after the first regulation and the regulation pressure after the second regulation; and adjusting the displacement of the pump to reduce the difference between the first regulation pressure after the first regulation and the regulation pressure after the second regulation.

24. The method of claim 22, further comprising:
storing the second regulation pressure after a first regulation of the second fluid circuit as a function of fluid temperature, transmission input speed, and transmission gear ratio;

determining a regulation pressure of the second fluid circuit after a second regulation of the second fluid circuit and storing the regulation pressure in the controller;

detecting a difference between the second regulation pressure after the first regulation and the regulation pressure after the second regulation; and adjusting the displacement of the pump to reduce the difference between the second regulation pressure after the first regulation and the regulation pressure after the second regulation.

25. The method of claim 12, further comprising triggering the pressure switch from a first position to a second position once the regulation pressure is detected.

26. The method of claim 12, further comprising:
determining a current fluid pressure, a transmission input speed, a fluid temperature, a transmission gear ratio, a current pump displacement, and a correction factor;

receiving a signal indicative of whether a selectively engagable clutch is being filled; and determining an amount of fluid flow necessary from the pump to satisfy a flow demand for filling the clutch.

27. The method of claim 26, wherein the determining step comprises storing the correction factor in the controller as a function of transmission gear ratio, and searching a look up table to determine the correction factor.

28. The method of claim 26, further comprising determining a supply of fluid flow as a function of the transmission input speed, pump displacement, current fluid pressure, fluid viscosity, and the correction factor.

29. The method of claim 26, wherein the flow demand is a function of a feed orifice of the clutch and fluid pressure.

30. The method of claim 26, further comprising controllably adjusting the pump displacement until an amount of fluid flow from the pump satisfies the flow demand.

31. The transmission of claim 12, further comprising:
storing a desired fluid temperature in the controller;
determining a current fluid temperature in the hydraulic system; and
controllably adjusting fluid flow through the first and second flow circuits until the current fluid temperature is substantially the same as the desired fluid temperature.

32. The transmission of claim 12, further comprising:
storing the desired fluid temperature as a function of transmission input speed;
determining a current transmission input speed;
determining the desired fluid temperature based on the current transmission input speed; and
controlling the solenoid until the current fluid temperature is substantially the same as the desired fluid temperature.

33. The method of claim 12, further comprising:
storing a desired fluid flow profile as a function of converter slip speed in the controller;
calculating a current converter slip speed;
determining a desired fluid flow from the desired fluid flow profile based on the current converter slip speed;
determining a current fluid flow in the second fluid circuit; and
controllably adjusting pump displacement until the current fluid flow is substantially the same as the desired fluid flow.

34. A transmission system, comprising:
a controller;
a hydraulic control system including a plurality of fluid circuits, the hydraulic control circuit being controllable by the controller;
a variable displacement pump adapted to be driven by a torque-generating mechanism, the pump having an inlet and an outlet each fluidly coupled to the hydraulic control system, wherein the pump is configured to generate fluid flow and pressure throughout the hydraulic control system;
a first fluid circuit and a second fluid circuit of the plurality of fluid circuits each fluidly coupled to the pump, wherein the first fluid circuit is fluidly coupled between the pump outlet and the second fluid circuit;
a first regulator valve disposed in the first fluid circuit, the first regulator valve being configured to move between at least a regulated position and an unregulated position, where the regulated position corresponds to a first regulated pressure in the first fluid circuit;
a first pressure switch fluidly coupled to the first regulator valve and configured to move between a first position and a second position, wherein the first pressure switch is disposed in electrical communication with the controller;
a second regulator valve disposed in the second fluid circuit, the second regulator valve being configured to move between at least a regulated position and an unregulated position, where the regulated position corresponds to a second regulated pressure in the second fluid circuit;
a second pressure switch fluidly coupled to the second regulator valve and configured to move between a first position and a second position, where the second pressure switch is disposed in electrical communication with the controller; and
a solenoid disposed in electrical communication with the controller, the solenoid controllably coupled to the pump to adjust the displacement of the pump;
wherein, a set of instructions are stored in a memory of the controller, the set of instructions are executable by a processor of the controller to determine when the first regulation pressure and the second regulation pressure are achieved via signals from the first and second pressure switches, determine a leakage adaptive factor as a function of the first and second regulation pressures, a pump leakage factor, a hydraulic controls leakage factor, and a plurality of geometrical restrictions in the first and second fluid circuits, and adjust the displacement of the pump from a first displacement to a second displacement as a function of the leakage adaptive factor.

35. The system of claim 34, wherein the solenoid is operably controllable to adjust the displacement of the pump.

36. The system of claim 34, wherein the solenoid is actuable between a first state and a second state.

* * * * *